June 6, 1950 F. H. BRAY ET AL 2,510,062

ELECTRONIC SIGNAL REGENERATOR FOR TRANSLATING ALTERNATING CURRENT IMPULSES TO DIRECT CURRENT IMPULSES

Filed Jan. 29, 1945 4 Sheets-Sheet 1

Inventors
FREDERICK HARRY BRAY
LESLIE RONALD BROWN
By
Robert Harding Jr.
Attorney Inventors
FREDERICK HARRY BRAY
LESLIE RONALD BROWN
By Robert Harding Jr.
Attorney June 6, 1950 F. H. BRAY ET AL 2,510,062

ELECTRONIC SIGNAL REGENERATOR FOR TRANSLATING ALTERNATING CURRENT IMPULSES TO DIRECT CURRENT IMPULSES

Filed Jan. 29, 1945 4 Sheets-Sheet 3

Inventors
FREDERICK HARRY BRAY
LESLIE RONALD BROWN
By
Robert Harding Jr.
Attorney Inventors
FREDERICK HARRY BRAY
LESLIE RONALD BROWN
By Robert Harding Jr.
Attorney Patented June 6, 1950

2,510,062

UNITED STATES PATENT OFFICE 2,510,062

ELECTRONIC SIGNAL REGENERATOR FOR TRANSLATING ALTERNATING CURRENT IMPULSES TO DIRECT CURRENT IMPULSES

Frederick Harry Bray and Leslie Ronald Brown, London, England, assignors, by mesne assignments, to International Standard Electric Corporation, New York, N. Y., a corporation of Delaware Application January 29, 1945, Serial No. 575,118
In Great Britain February 11, 1944

12 Claims. (Cl. 179—16)

This invention relates to receivers for alternating current signals, such as trains of impulses at voice-frequency used for selection purposes in automatic telephone systems operating over long distances.

One of the objects of the invention is to safeguard against false operation of a receiver by transients on the line. Another object is to enable the receiver to function satisfactorily in response to signals of varying signal strengths. Yet another object, where the receiver passes on the received signals either as alternating currents or otherwise, is to enable the signals to be corrected in their timing.

The several features of the invention are set out in the appended claims.

The description that follows relates to the accompanying drawings, in which:

Fig. 2 is the circuit diagram of a receiver being a first embodiment of the invention, while

Figure 2:
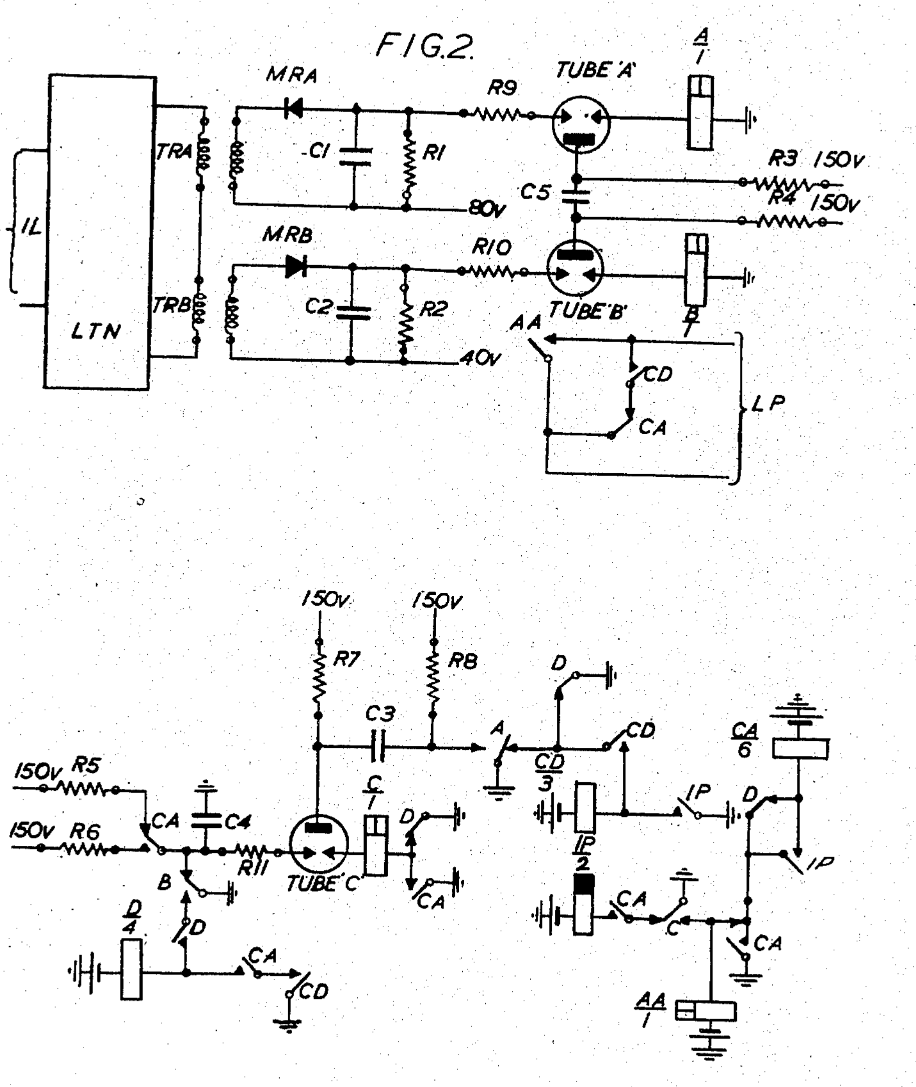

In Fig. 2, an incoming line IL adapted to carry voice-frequency signals terminates in a line terminating network LTN which on its output side has the primaries of two transformers TRA and TRB connected in series with one another. The secondaries of these transformers are in series with oppositely-poled rectifiers MRA and MRB and are connected across a resistance R1 or R2 shunted by a condenser C1 or C2. The lower ends of the resistances R1 and R2 are connected to sources of positive voltage, one of 80 v. and the other of 40 v., while the upper ends are connected over resistances R9 and R10 to the control electrodes of cold cathode tubes A and B. The other electrodes or cathodes are connected to relays A and B, while the two anodes of the tubes are connected together over condenser C5, and also to a +150 volt source over resistances R3 and R4. In the lower part of the diagram is shown a condenser C4, normally shunted by contacts of relay B, and connected to a control electrode of a third cold cathode tube C, which has the associated relay C controlling relay AA. Contacts of relay AA appear in the loop LP to the incoming equipment responsive to D. C. impulses.

*Circuit operation*

Figure 1:
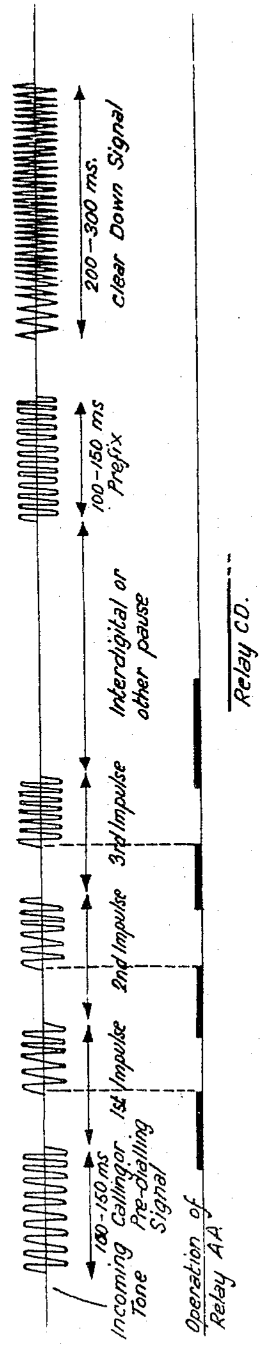
Fig. 1 is a chart showing the signal code used in that embodiment of the invention shown in Fig. 2.

It is necessary first to explain the signal code used in the system being described, reference being made for this purpose to Fig. 1. The signalling is by A. C. tones incoming over the line IL. The calling or predialling signal consists of a tone of some 100 to 150 milliseconds duration. This calling signal is followed by impulse-trains designating the several digits or other characters: each impulse consists of a "break" followed by a "make." At the end of an impulse train the inter-digital or final pause is marked by an absence of signal on the line following the "make" portion of the last impulse of the preceding train. Finally, the clear down signal consists of a prefix tone of say 100–150 milliseconds followed after a short pause by a tone of say 200–300 milliseconds.

The D. C. impulses repeated to the incoming equipment are shown in the lower line of Fig. 1, representing the operation and releasing of relay AA.

So long as there is no signal incoming over the line IL, the tube A is ionised due to the 80 v. across its control gap, and of course relay A is operated.

When an A. C. signal arrives, it is passed through the line terminating equipment LTN to the transformers TRA and TRB. The induced voltage in the secondary of TRB, acting over the rectifier MRB, charges up condenser C2 so that the voltage across the control gap of tube B is raised above the standing 40 v., and tube B fires, thus operating relay B and extinguishing tube A over condenser C5. Relay A is now released. The contact of relay B now removes the short-circuit around condenser C4, and this condenser begins to charge up at a rate determined by its own capacitance and by the value of resistance R5. Tube A will remain extinguished and relay A released so long as the incoming signal persists, since the voltage developed across condenser C1 from the secondary of transformer TRA in series with rectifier MRA will be in opposition to the standing +80 volts and will reduce the control gap voltage below that necessary for striking.

If the incoming signal should be only a transient, that is to say it persists for a less time than that required to charge condenser C4 to a certain value as will be described, then at the end of the signal, condenser C1 will discharge through resistance R1, and the full 80 volts will appear across the control gap of tube A, so that tube A will strike, operating relay A, and quenching tube B so that relay B will release and discharge condenser C4.

On the other hand, if the incoming signal persists for longer than a predetermined minimum for a correct call signal time, say 100 to 150 milliseconds, then the condenser C4 will charge up to the striking voltage of tube C, so that tube C strikes and operates relay C.

Relay AA operates, and loops the incoming equipment at LP.

The six contacts of relay CA operate, and one of them alters the time of charge of condenser C4 by replacing the resistance R5 by resistance R6 of different value, so that hereafter the said time of charge is equal to the correct break impulse.

The circuit remains thus, with tubes B and C fired, and relays B, C, AA, CA operative, until the end of the calling signal, i. e. until the beginning of the break portion which is prior to the reception of the first impulse.

The break portion of an impulse consists of a disconnection of signal from the line for a period of time which may vary considerably: at the beginning of the break tube A strikes, operating relay A, extinguishing tube B, releasing relay B, and discharging condenser C4. But tube C still remains ionized. At the end of the break tube B again strikes, extinguishing tube A, releasing relay A, operating relay B, and starting the charge of condenser C4, this time at a different rate as already mentioned; also the release of relay A quenches tube C through condenser C3. The alternate operations of tubes and relays A and B are thus carried on without altering the setting of the contacts of relay CA.

It is the end of the incoming break that initiates the generation of the corresponding D. C. impulse. Thus relay C in releasing with tube C, causes release of relay AA and thus opens the loop LP to mark the beginning of a break impulse to line. The end of the impulse is determined by the charging time of condenser C4, tube C then firing, operating relay C, and re-operating relay AA to re-close the loop.

When, at the end of the incoming break and beginning of the regenerated D. C. impulse, the relay C released, relay CA being still operative it caused relay IP to operate, followed by relay CD: then with relays CA and CD both operative, the four contacts of relay D operated. All these relays, IP, CA, CD, D, will remain up throughout the train of impulses constituting one digit, by reason of the slow-release characteristic of relay IP. At the end of the digit, i. e. when the absence of signal persists for a longer time, tube A strikes and remains ionised. Relay C remains operative long enough so that relay IP releases, followed by relays CA, C, and D. The circuit is now again normal except that relay CD remains operative and maintains a loop to the incoming equipment via a back contact of relay CA and front contact of relay CD equipment.

Further digits will be repeated, with regeneration, as described above.

On receipt of the clear down signal, tube C will strike as previously described, but A will not re-strike till some 200–300 ms. later, at the end of the clear down signal. With relay C operated, relay IP will release after 100–150 ms. and relay IP releasing releases relay CA. Relay IP also releases CD since under clear down conditions relay A is unoperated. Relay CD releasing breaks the loop to the incoming equipment since relay CA releases relay C, and relay C releasing releases relay AA. Relay D remains operated so long as the clear down signal remains on the line and tube B remains struck so that the control gap circuit of tube C is disconnected.

When the clear down signal is disconnected, tube A re-strikes, and extinguishes tube B releasing relay B. Relay B releasing releases relay D and the circuit is completely cleared down.

Thus in the light of the preceding description of the circuit operation, it will be seen that the following are the functions of the respective cold cathode tubes.

Tube A: In connection with tube B it forms a guard on the line so that transients, irrespective of their strength, will not cause faulty operation: by its release at the end of the break portion of an impulse it quenches tube C to begin the break portion of a repeated D. C. impulse.

Tube B: Co-operates with tube A as above.

Tube C: Under control of condenser C4 it measures off the correct prefix length as a guard against transients; and also under control of condenser C4 it ends the break portion of a repeated D. C. impulse.

Figure 3:
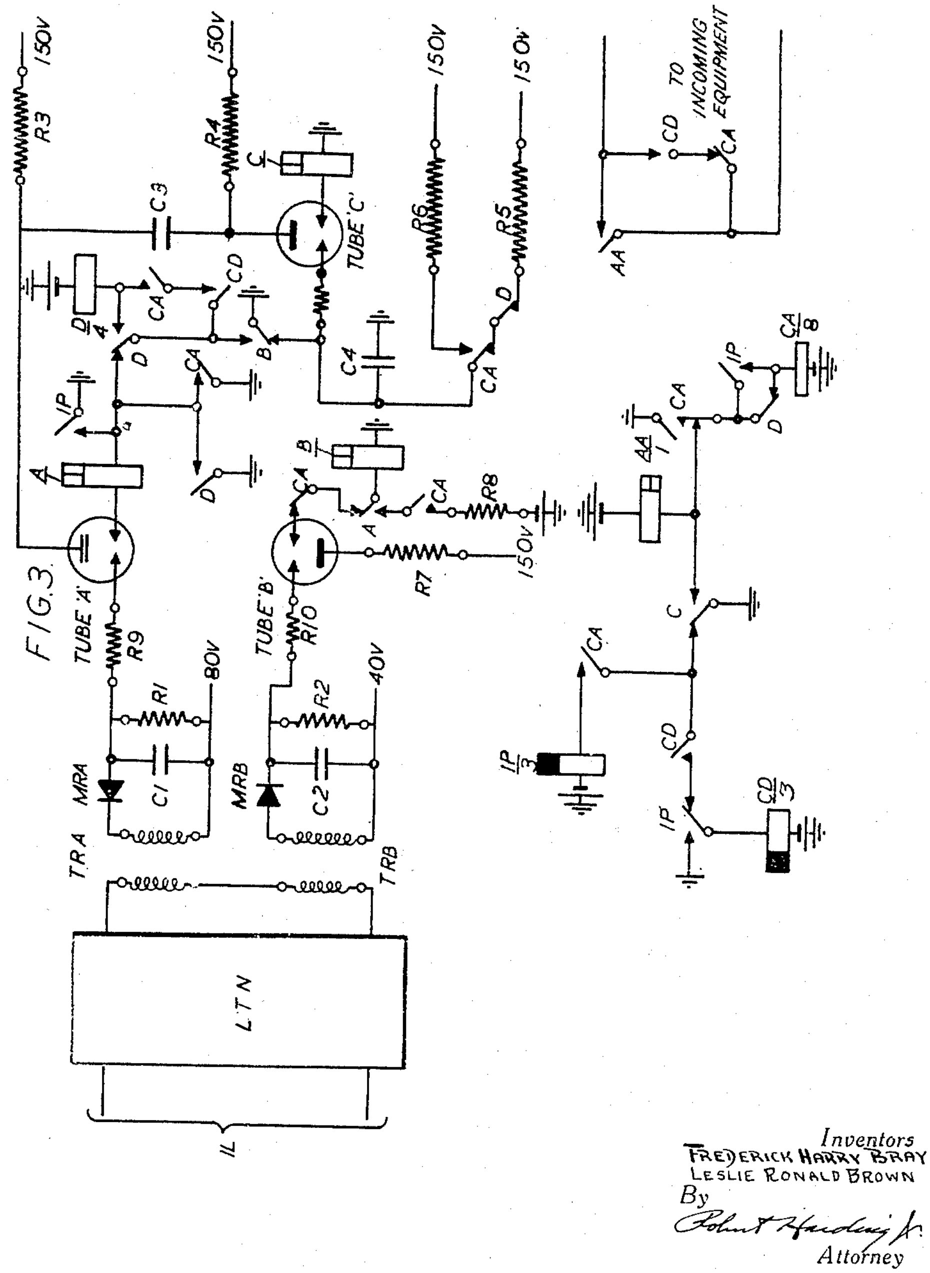
Figs. 3 and 4 are the similar circuit diagrams of other receivers embodying the invention.

An alternative scheme is shown in Fig. 3, in respect of which the signal code is substantially the same as that shown in Fig. 1, the only difference being that the last impulse of a train has its make portion lengthened to say 150–200 milliseconds.

The arrangement of the tubes A and B is somewhat similar to that of Fig. 2, but tube A is not normally ionised because its circuit is not complete beyond the relay A. Reception of a signal fires tube B, so that relay B operates to close the control gap circuit of tube A and to remove the short-circuit across condenser C4. Tube A will not fire yet because of the counter-voltage developed by the incoming tone across condenser C1.

In the case of a transient, at the end of the signal condenser C1 will discharge through R1, and the voltage across the control gap of tube A will increase to 80 volts, causing this tube to strike. Relay A will operate and release relay B, condenser C4 will discharge, tube A quench and relay A release, so that the circuit will be completely restored to normal.

On the other hand a signal of the proper length will persist until condenser C4 charges sufficiently for tube C to strike and operate relay C. This brings up relay AA to loop the incoming equipment. Relay CA also operates and changes over the charging circuit of condenser C4 from resistance R5 to resistance R6 to give the appropriate timing of the regenerated impulses. The opening of the control gap circuit of tube B at contacts of relay CA, quenches that tube and releases its associated relay B.

On the first disconnection of tone, representing the beginning of the break portion of the first impulse, tube A strikes, and extinguishes tube C over condenser C3. Relays C and and AA release, the latter marking the beginning of the break portion of the repeated impulse. Relays IP and CD operate. The operation of relay A brings up relay B, which starts condenser C4 charging to determine the duration of the regenerated break. In due course therefore, tube C strikes, quenching tube A and operating relay C, relay AA re-operates to reclose the loop.

Successive impulses of the train will be received in a similar manner, the next break impulse re-striking tube A and extinguishing tube C. At the end of the train, when tube C restrikes after having measured out the break period of the last impulse, tube A does not re-strike for some 100–150 milliseconds, owing to the lengthening of the make portion of the last impulse to form a digit guard signal. Thus relay IP releases, followed by relay CA. At the end of the digit guard signal, tube A strikes and extinguishes tube C. Relay A operates, B releases, relay D releases, and so relay A releases. The circuit is again normal except for relay CD being operative, maintaining a loop to the incoming equipment.

Further digits will be repeated in the same manner.

On receipt of the clear down signal, tube C will strike as previously described, but tube A will not restrike until the end of the clear-down signal, some 400–600 milliseconds later. With relay C operated, relay IP will release after 100–150 ms. and relay IP releasing releases relay CA. Relay IP releasing with relay C still operated releases relay CD after 120–200 ms.

At the end of the clear down signal, tube A re-strikes, since relay D has been holding to relay B. Tube A striking extinguishes tube C and operates relay A, which in turn releases relay D. Relay C releasing releases relay AA, which breaks the loop to the incoming equipment since relay CD has released. Relay D releasing restores the circuit back to normal ready to be re-seized.

Thus the function of the three cold-cathode tubes may be summarized as follows:

Tube B fires at the beginning of a signal;

Tube A fires at the beginning of the subsequent break;

Tube C fires under control of condenser C4 at predetermined intervals of time after the firing of tube B or A, and on firing quenches whichever of tubes B or A is then ionised.

Figure 4:
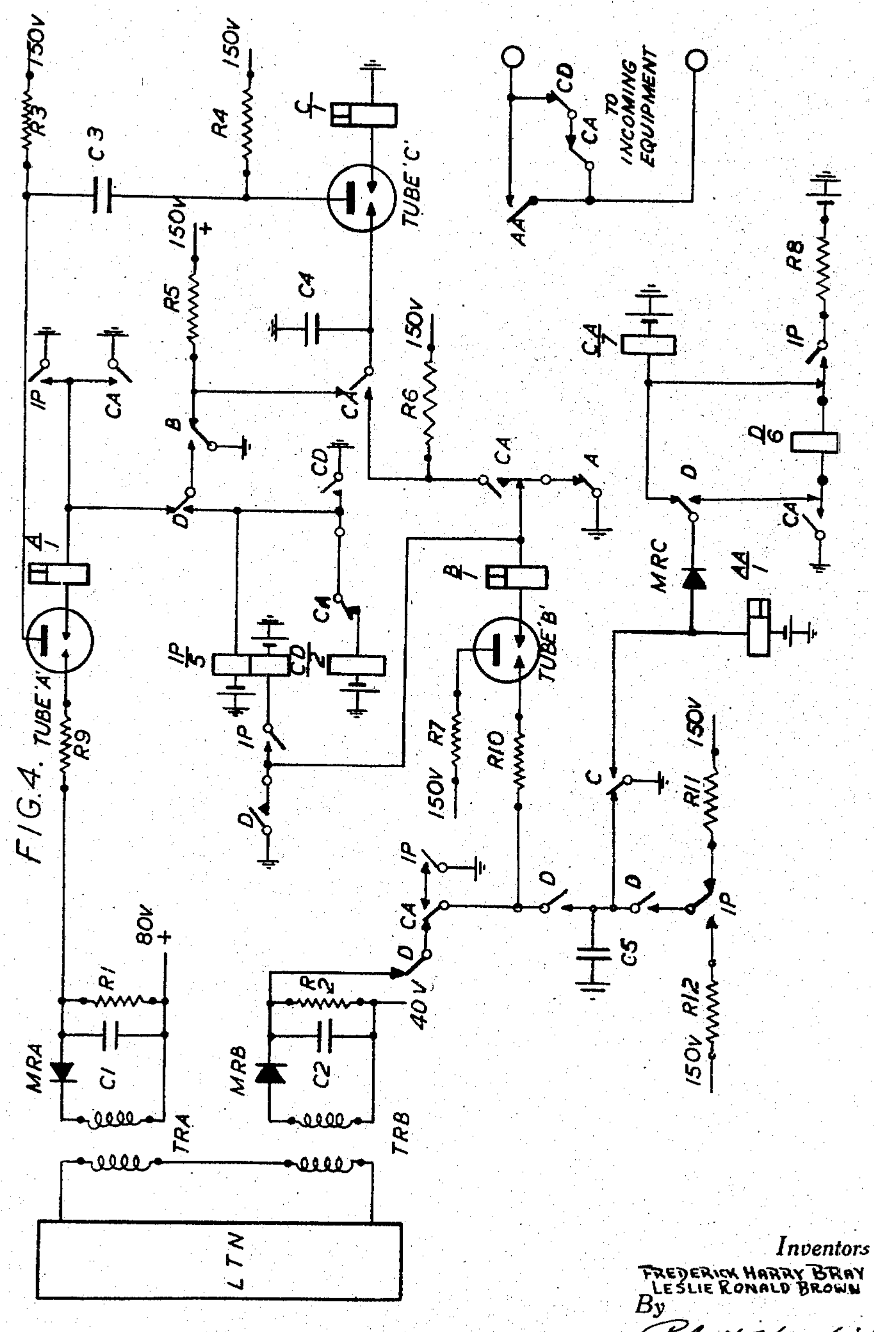

A third embodiment of the invention is that which is shown in Fig. 4. The signal code there used is the same as that for the embodiment shown in Fig. 3.

When the circuit is not in use, relay CD is operated.

When a signal arrives, the voltage developed across condenser C2 suffices to fire tube B and operate relay B. This starts condenser C4 charging over resistance R5, and also closes the control gap circuit of tube A.

If the signal is only a transient, at its end tube A will fire, relay A operate, releasing relay B and discharging condenser C4. Tube A will be quenched and relay A released, so that the circuit is restored to normal.

If, on the other hand, the signal persists for the required minimum period, then, as in the previous cases, condenser C4 charges up and fires tube C. Relay C operates, followed by relays AA and CA. Relay AA closes the loop to the incoming equipment; while relay CA provides an alternative circuit for relay A which is independent of relay B contacts, changes the charging circuit for condenser C4 from resistance R5 to R6, and disconnects the control gap of tube B from the transformer TRB.

At the beginning of the first break, tube A strikes, quenching tube C over condenser C3 and operating relay A. The release of relay C causes release of relay AA to start the transmission of a break to the loop LP; it also removes the short-circuit on relay D so that relay D operates. The operation of relay A causes condenser C4 to start charging.

The end of the break to the loop is determined by the charging of condenser C4 to fire tube C. This extinguishes tube A, and operates relay C, which in turn operates relay AA to re-close the loop and starts the charging of condenser C5 over resistance R11.

When the signal is again removed, tube A re-strikes, relay A operates, tube C is extinguished, and relay C released. Relay AA releases, and the operation is then as already described for the first impulse.

At the end of the digit, on the re-operation of tube C tube A does a restrike for a further 100–150 milliseconds (and of digit guard signal). With C operated for 100–150 milliseconds, the potential across condenser C5 increases sufficiently for the tube B to strike, operating relay B. Hence relay IP operates, and relay CA releases. While both IP and CA are up, condenser C5 is discharged. The operation of relay IP causes tube B to be extinguished and relay B to be released. Condenser C5 now begins to charge up through resistance R12, which is adjusted to measure that clear-down signal.

When the interdigital signal is removed from the line, tube A fires and quenches tube C. Relay C in releasing discharges condenser C5 and releases relay D. This in turn releases relay IP. All the relays are now released, including CD, so that the loop LP to the incoming equipment is maintained over back contacts of relays CA and CD.

Further digits will be received and repeated in the manner as thus described.

Reception of the clear-down signal will cause relay IP to operate as previously described, and condenser C5 will charge up over resistance R12. Tube A will not strike because of the persistence of the clear-down signal on the line. Ultimately condenser C5 will become so charged that tube B will fire, operating relays B and CD. At the end of the clear-down signal, tube A fires, operating relay A and quenching tube C. Relays B, C and IP release, and the circuit clears down with only relay CD left operated ready for the next seizure.

The functions of the tubes are therefore as follows:

Tube B fires at the beginning of a signal in direct response to the tone, and also after a predetermined persistence of the end-of-digit signal under the control of condenser C5.

Tube A fires at the end of a signal.

Tube C fires under control of condenser C4 to determine the correct length of an incoming prefix and the correct length of an outgoing break.

What is claimed is:

1. A receiver for make and break signals comprising a transformer secondary circuit responsive to AC signals including a rectifier and a cold cathode tube adapted to be fired with the increase of current in the secondary coil, means to extinguish the tube upon collapse of the energizing signals, and means operable by the said tube to measure the duration of a signal, comprising a cold cathode tube, a condenser, a resistance and a source of current, the resistance and the condenser being proportioned to require a selected charging time before the tube is fired whereby signals of too brief duration are rejected.

2. Apparatus for translating make and break AC signals into make and break DC signals comprising two secondary AC transformer circuits, each including a rectifier connected in opposite polarity in its arrangement therein to the arrangement in which the other rectifier is connected in the circuit of its secondary, a first tube coupled to one of said rectifiers to be fired by the make portion of an AC signal, a second tube coupled to the other of said rectifiers to be fired by the break portion of the AC signal, a normally inoperative time measuring circuit adapted to be energized by operation of said first tube, a third tube adapted to be fired by the measuring circuit when it has measured a predetermined time, and means operable by said third tube to transmit DC signals, the durations of the break parts of which are determined by the measuring circuit.

3. A receiver for intermittent signals comprising three cold cathode tube circuits, means to energize one of said circuits in response to intermittent electrical signals, means operable by said one circuit to energize another of said circuits, means to delay the energizing thereof, and means operable by the third circuit to deenergize both said circuits upon termination of the signal.

4. A repeater of make and break signals comprising three cold cathode tubes, means to fire one of the tubes at the beginning of a make signal, means to fire another of the tubes substantially at the beginning of a subsequent break, and a condenser charging circuit connected to the third of the tubes, the third of the tubes being fired by the firing of either of the others of the tubes after a delay controlled by the charging rate of the condenser, and quenching means responsive to the firing of said third tube to quench the tube which fired said third tube.

5. A repeater comprising three interconnected ionic tube circuits, means to ionize a first one of said tubes and to quench a second tube upon receipt of a signal, means responsive to conduction of said ionized first tube and coupled to said third tube to provide delayed ionization of said third tube, and means coupled to said third tube and responsive to the quenching of said second tube upon termination of the signal to quench said third tube.

6. A receiver for alternating current impulses comprising a first and a second condenser, means for rectifying the impulses to charge the first condenser with negative charge and the second condenser with positive charge, a first and a second gas filled tube, means for biasing the control electrode of the first tube to above its ignition potential, the first condenser being connected to the control electrode of the first tube to lower its bias during an impulse, the second condenser being connected to the control electrode of the second tube to raise its bias during an impulse, a third condenser connected between the anodes of the first and second tubes, and means for supplying anode potentials to the tubes.

7. A receiver for alternating current impulses comprising an input circuit for the impulses, a pair of transformer secondaries coupled to the input circuit, a first condenser and a first rectifier connected in a series circuit across one of the secondaries, a second condenser and a second rectifier connected in a series circuit across the other secondary, a first resistor in shunt to the first condenser, a second resistor in shunt to the second condenser, a first and a second cold cathode tube, a third condenser connected between the anodes of the tubes, at least one source of anode potential for the tubes, two plate load resistors, the anode of each tube being connected to a source of anode potential through one of the plate load resistors, a first source of biasing potential connected in circuit with the first condenser and the control gap of the first tube, a second source of biasing potential connected in circuit with the second condenser and the control gap of the second tube, the first rectifier being poled to conduct charges into the first condenser during alternating current impulses to increase the biasing potential of the first tube, the second rectifier being poled to conduct charges into the second condenser during alternating current impulses to decrease the biasing potential of the second tube, and a switching device in series with the anode-to-cathode circuit of one of the tubes.

8. A receiver for alternating current impulses whose periods include make and break portions comprising, at least part of a controlled circuit, switching means for looping the controlled circuit, an input circuit for the alternating current impulses, a gas tube circuit electrically connected to the input circuit and including a gas tube and a relay, said tube being adapted to fire in response to a portion of an AC impulse to actuate said relay, time measuring means responsive to the operation of said relay for measuring a predetermined time and to stop measuring if said portion has less than a predetermined duration, the time measuring means being connected to the switching means for actuating said switching means after the measured time to loop the controlled circuit until the next time the measuring means is started.

9. A receiver as in claim 8 in which there is provided switching means responsive to an actuation by the measuring means to alter the circuit of said measuring means for controlling the next measured time.

10. A receiver as in claim 8, in which the gas tube circuit comprises a first and a second condenser, means for rectifying the impulses to charge the first condenser with negative charge and the second condenser with positive charge, a first and a second gas filled tube, means for biasing the control electrode of the first tube to above its ignition potential, the first condenser being connected to the control electrode of the first tube to lower its bias during an impulse, the second condenser being connected to the control electrode of the second tube to raise its bias during an impulse, a third condenser connected between the anodes of the first and second tubes, and means for supplying anode potential to the tubes.

11. A receiver as in claim 8, in which the time measuring means comprises a timing gas filled tube, a condenser connected to the control gap of the timing tube, and means for charging the condenser at a predetermined rate, and the gas tube circuit comprises means for removing a short circuit from across the condenser to start the measuring means.

12. A receiver as in claim 8, in which the time measuring means comprises a timing gas filled tube, a condenser connected to the control gap of the timing tube, and means for charging the condenser at a predetermined rate, and the gas tube circuit comprises means for removing a short circuit from across the condenser to start the measuring means, and means for quenching the timing tube in response to a portion of an alternating current impulse.

FREDERICK HARRY BRAY.
LESLIE RONALD BROWN.

REFERENCES CITED

The following references are of record in the file of this patent:

UNITED STATES PATENTS

| Number | Name | Date |
|---|---|---|
| 2,022,030 | Dimond | Nov. 26, 1935 |
| 2,038,199 | Ressler | Apr. 21, 1936 |
| 2,059,562 | Curtis et al. | Nov. 3, 1936 |
| 2,229,125 | Pray | Jan. 21, 1941 |
| 2,287,926 | Zepler | June 30, 1942 |
| 2,361,845 | Hutchins | Oct. 31, 1944 |
| 2,424,999 | Ostlund | Aug. 5, 1947 |

FOREIGN PATENTS

| Number | Country | Date |
|---|---|---|
| 560,132 | Great Britain | Mar. 21, 1944 |